United States Patent Office 3,781,304
Patented Dec. 25, 1973

---

3,781,304
PRODUCTION OF TRIOXANE
Hugo Fuchs and Albrecht Hilt, Ludwigshafen, Germany, assignors to Badische Anilin- & Soda-Fabrik Aktiengesellschaft, Ludwigshafen am Rhine, Germany
No Drawing. Filed Jan. 24, 1972, Ser. No. 220,375
Int. Cl. C07d 19/00
U.S. Cl. 260—340                                4 Claims

ABSTRACT OF THE DISCLOSURE

Production of trioxane from aqueous formaldehyde solutions in the presence of mixtures of boric acid and phosphoric acid as acid catalysts.

---

The invention relates to a process for the production of trioxane from aqueous formaldehyde solutions in the presence of acid catalysts.

The production of trioxane by trimerization of formaldehyde is known. It is generally carried out by boiling an aqueous concentrated formaldehyde solution in the presence of an acid catalyst, removing the synthesis vapor containing trioxane formed from the reactor by distillation, concentrating the trioxane therein by a known method in a column and isolating the trioxane therefrom. According to French Pat. No. 1,377,169 this method may also be carried out in the presence of an inert liquid having only partial miscibility with the reaction mixture or none at all. The yield of trioxane depends in the prior art methods on the strength of the acid of the acid catalyst used. To achieve satisfactory yields it has therefore been necessary to use strong acids, such as sulfuric acid. This has the disadvantage, however, that vessels made of corrosion-resistant materials are necessary for carrying out the reaction. Vessels of lead, ceramics or glass are therefore required. Lead vessels are difficult to handle because of their weight and moreover they have only limited durability. Ceramic and glass vessels have the disadvantage that they are not unbreakable and therefore reliability in operation is impaired.

In this state of the art the invention has for an object to provide a process for the production of trioxane from aqueous formaldehyde solutions which can be carried out in apparatus made of stainless steel and which nevertheless results in high space-time yields. The said object is achieved according to the invention by carrying out the reaction in the presence as catalyst of a mixture of boric acid and phosphoric acid with or without other acids.

It has been found that surprisingly such reaction mixtures do not attack stainless steel. This is the more astonishing because boric acid or phosphoric acid alone does not exhibit this effect. Similarly when boric acid or phosphoric acid is added to other acids, corrosion takes place, admittedly to a slightly lesser extent when boric acid is added. It has also been found that when phosphoric acid or boric acid is used alone as the catalyst, the yield of trioxane is greatly decreased.

Examples of acids which may be used as catalysts together with the mixture of boric acid and phosphoric acid according to the invention are sulfuric acid, chlorosulfonic acid and potassium hydrogen sulfate. The proportion of these acids in the whole acid mixture is generally from 1 to 25% by weight.

For carrying out the process according to the invention, the mixture of boric acid and phosphoric acid added as catalyst is usually used in amounts of from about 1 to 30% by weight based on the amount of formaldehyde solution used, preferably in amounts of from 10 to 25% by weight. The ratio by weight of boric acid to phosphoric acid is usually within the range from about 20:1 to 1:20, particularly 1:4 to 4:1. According to an advantageous embodiment of the invention the reaction is carried out in the presence of inert liquids which are only partly miscible with the reaction mixture or not at all.

The following experiments have been carried out to demonstrate the technical advance achieved by the invention:

(1) Trioxane synthesis 700 to 900 g. of aqueous formaldehyde solution is pumped from a supply burette by means of a pump into a synthesis vessel capable of being heated and stirred. This contained 2 kg. of synthesis mixture (at about 105° C.) containing the acid. An amount of synthesis mixture equivalent to the feed is distilled off over a riser (temperature of vapor 97° C.), condensed in a descending condenser kept thermostatically at 60° C. and collected in a stirred vessel. Venting takes place through a water condenser (room temperature). The reaction period is from five to seven hours. The condensate is analyzed. The results are collected in Table 1 in which the following abbreviations are used:

F=formaldehyde concentration of the aqueous solution in percent by weight
C=concentration of the acid in percent by weight
TV=amount of trioxane in percent by weight in the vapor
FV=amount of formaldehyde in percent by weight in the vapor.

TABLE 1

| F | Acid | C | TV | FV |
|---|---|---|---|---|
| 50.7 | Phosphoric acid plus | 10 | 13.1 | 43.6 |
|  | Boric acid | 20 |  |  |
| 50.8 | Phosphoric acid plus | 15 | 12.2 | 44.3 |
|  | Boric acid | 30 |  |  |
| 57.8 | Phosphoric acid plus | 10 | 17.9 | 46.1 |
|  | Boric acid | 20 |  |  |
| 50 | Boric acid plus | 20 | 15.0 | 36.0 |
|  | Phosphoric acid plus | 10 |  |  |
|  | Sulfuric acid | 5 |  |  |
| 60 | Boric acid plus | 20 | 20.9 | 42.5 |
|  | Phosphoric acid plus | 10 |  |  |
|  | Sulfuric acid | 5 |  |  |
| 52.5 | Boric acid | 20 | 4.6 | 47.1 |
| 50.0 | Phosphoric acid | 10 | 6.6 | 44.8 |
| 49.8 | do | 20 | 11.9 | 41.0 |

It may be seen from Table 1 that the yields of trioxane when mixtures of phosphoric acid and boric acid according to the invention are used are clearly higher than those obtained by the use of phosphoric acid or boric acid alone.

(2) Corrosion tests

Small samples steel plates are dipped on a Teflon thread into a 50% aqueous formaldehyde solution containing the added acid. The aqueous solution is heated under reflux at temperatures of from 103 to 105° C. Weighing of the plates is carried out after certain intervals.

The results collected in Table 2 show that standard steel is strongly attacked by the reaction mixture, whereas in the case of samples of V2A steel an increase in weight is recorded, i.e. passivation takes place. The increase in weight with reference to the weight of the original steel samples remains constant depending on the running time (Table 3), i.e. the weight of the passivation layer remains constant. When boric acid or phosphoric acid is added to other acids, corrosion takes place as shown in Table 4 although it is less in the case of boric acid.

The following abbreviations are used in Table 2:
C=concentration of the acid in percent by weight
M=material
DT=duration of test in hours
AWt=alteration in weight in percent
Sta=standard steel
V2A=V2A steel
V4A=V4A steel
+=dissolved after 100 hours
++=dissolved after 72 hours.

TABLE 2

Corrosion test on steels with mixtures of phosphoric acid and boric acid

| Acid | C | M | DT | AWt |
|---|---|---|---|---|
| Phosphoric acid | 10 | Sta | + | −100 |
| plus | | V2A | 936 | +0.83 |
| Boric acid | 20 | V4A | 936 | +1.1 |
| Phosphoric acid | 3 | Sta | 118 | −9.7 |
| plus | | V2A | 118 | +0.26 |
| Boric acid | 20 | V4A | 118 | +0.18 |
| Phosphoric acid | 20 | Sta | 90 | −75 |
| plus | | V2A | 90 | +0.03 |
| Boric acid | 20 | V4A | 90 | +0.01 |
| Phosphoric acid | 20 | Sta | 118 | −78.2 |
| plus | | V2A | 118 | +2.6 |
| Boric acid | 5 | V4A | 118 | +2.9 |
| Phosphoric acid | 10 | Sta | 118 | −42.9 |
| plus | | | | |
| Boric acid | 20 | V2A | 118 | +4.0 |
| plus | | | | |
| Sulfuric acid | 5 | V4A | 118 | +0.9 |
| Phosphoric acid | 20 | Sta | 140 | −59.9 |
| plus | | | | |
| Boric acid | 5 | V2A | 1,407 | +4.0 |
| plus | | | | |
| Sulfuric acid | 5 | V4A | 140 | +4.4 |
| Boric acid | 20 | Sta | 192 | −55.5 |
| | | V2A | 192 | −0.9 |
| | | V4A | 192 | −0.7 |
| Phosphoric acid | 15 | Sta | ++ | −100 |
| | | V2A | 192 | −0.22 |
| | | V4A | 192 | −0.37 |

TABLE 3

Change in weight of V2A steel and V4A steel using a mixture of 10% by weight phosphoric acid and 20% by weight boric acid in dependence on the period of action

| Material | Time of test in hours | Increase in weight in percent over original metal sample |
|---|---|---|
| V2A | 288 | +0.77 |
| | 624 | +0.82 |
| | 660 | +0.79 |
| | 864 | +0.84 |
| | 936 | +0.83 |
| V4A | 288 | +0.97 |
| | 624 | +1.10 |
| | 660 | +0.97 |
| | 864 | +1.09 |
| | 936 | +1.11 |

The same abbreviations are used in Table 4 as in Table 2:

TABLE 4

Corrosion tests on steels with acids

| Acid | C | M | DT | AWt |
|---|---|---|---|---|
| Sulfuric acid | 10 | Sta | +++ | −100 |
| | | V2A | 93 | −3.4 |
| | | V4A | 93 | −1.3 |
| Sulfuric acid plus Boric acid | 10 20 | Sta V2A V4A | 144 144 144 | −100 −0.3 −0.19 |
| Sulfuric acid plus Phosphoric acid | 10 10 | V2A | 120 | −7.3 |
| Potassium hydrogen sulfate | 20 | Sta V2A V4A | 192 192 192 | −25 −4.2 −2.3 |
| Potassium hydrogen sulfate plus Boric acid | 20 20 | Sta V2A V4A | 216 216 216 | −100 −1.0 −2.0 |
| Potassium hydrogen sulfate plus phosphoric acid. | 20 | Sta V2A V4A | 100 936 936 | −100 −7.1 −4.0 |

+++=Dissolved after 24 hours.

We claim:

1. A process for the production of trioxane by boiling an aqueous formaldehyde solution in the presence of an acid catalyst, wherein from 1 to 30% by weight, based on the formaldehyde solution, of a mixture of boric acid and phosphoric acid is used as the acid catalyst and wherein the ratio of boric acid to phosphoric acid is within the range from 20:1 to 1:20.

2. A process as set forth in claim 1, wherein the acid catalyst contains sulfuric acid, chlorosulfonic acid or potassium hydrogen sulfate in an amount of from 1 to 25% by weight of the whole acid mixture.

3. A process as set forth in claim 1 wherein the said amount of acid catalyst is from 10 to 25% by weight.

4. A process as set forth in claim 1 wherein the ratio of boric acid to phosphoric acid is within the range from 1:4 to 4:1.

References Cited

UNITED STATES PATENTS 2,864,827  12/1958  Baer et al. _____ 260—340
3,697,546  10/1972  Asakawa et al. _____ 260—340

FOREIGN PATENTS 949,145  2/1964  Great Britain _____ 260—340
1,199,650  7/1970  Great Britain _____ 260—340
20,552  9/1965  Japan _____ 260—340

NORMA S. MILESTONE, Primary Examiner